April 19, 1938. G. Q. HEPPNER 2,114,563
WEEDING MACHINE
Filed March 17, 1937 4 Sheets-Sheet 2
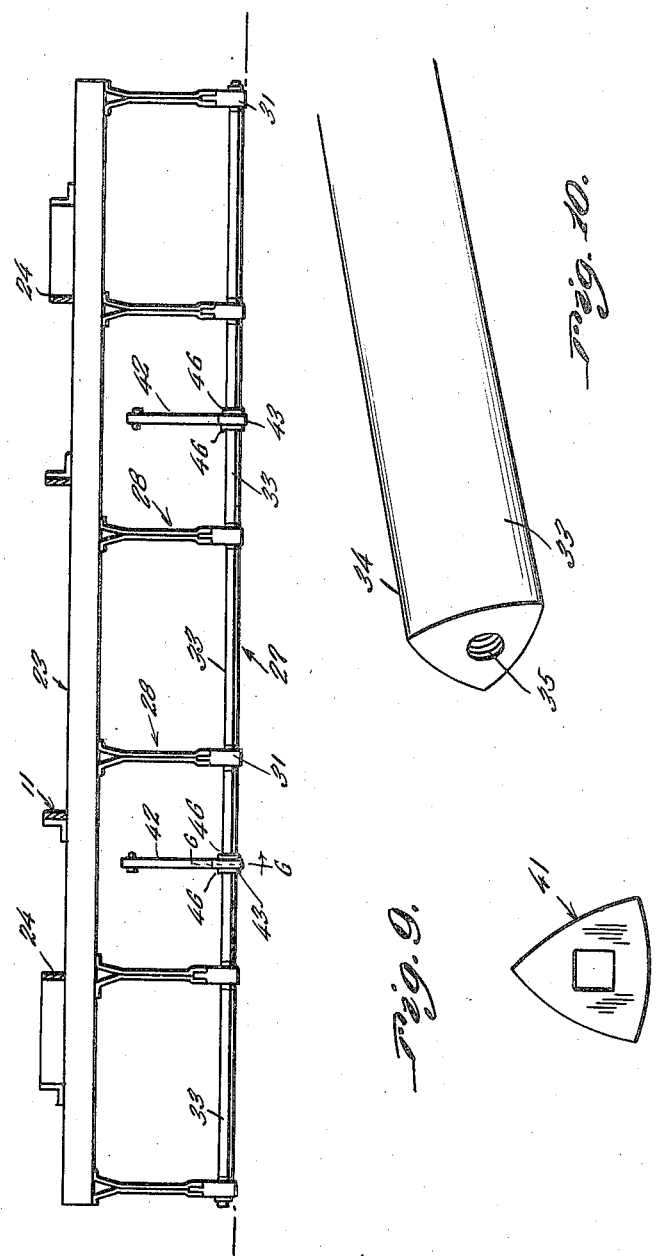
Inventor
G. Q. Heppner
By Clarence A. O'Brien
Hyman Berman
Attorneys April 19, 1938.　　　G. Q. HEPPNER　　　2,114,563
WEEDING MACHINE
Filed March 17, 1937　　　4 Sheets-Sheet 3
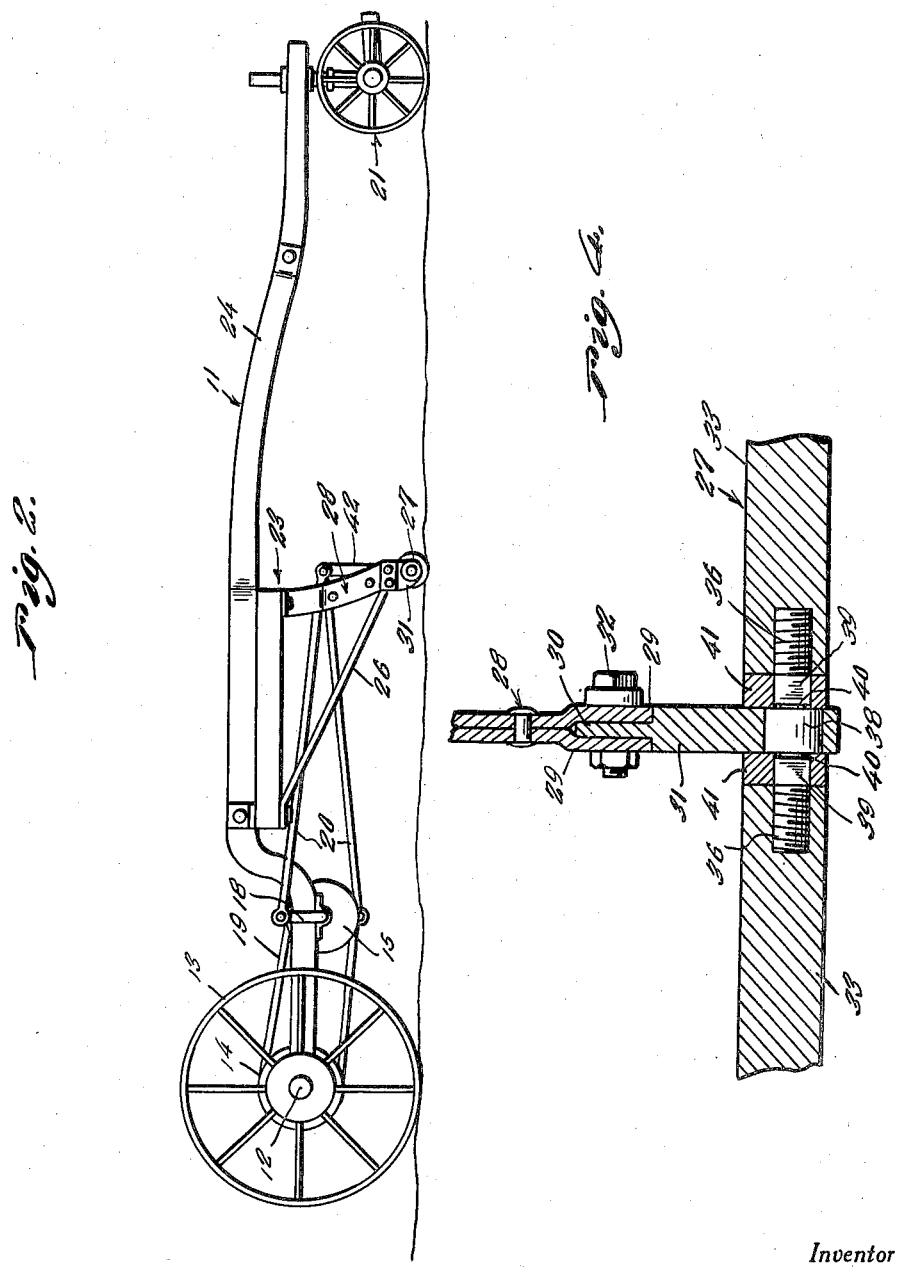

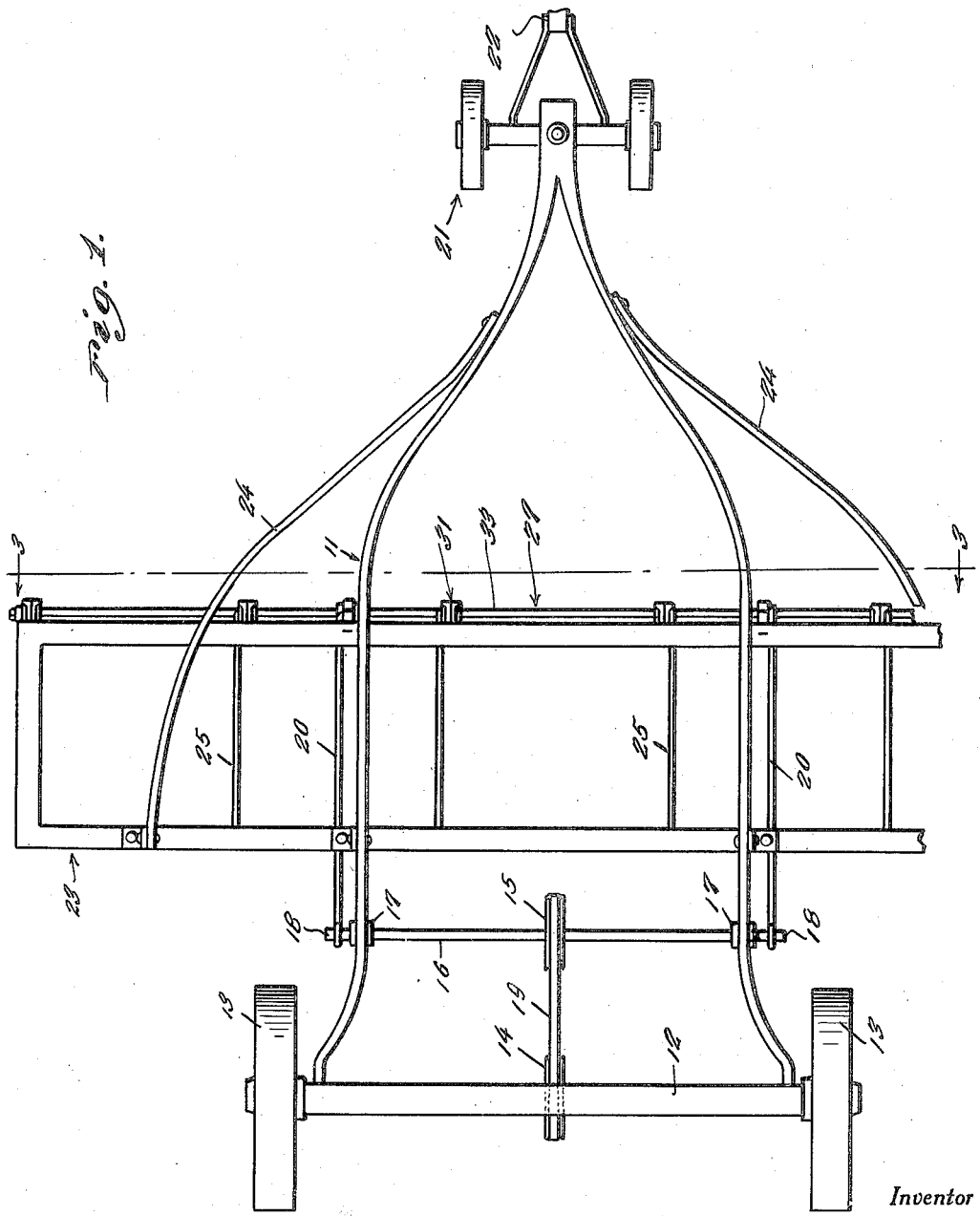

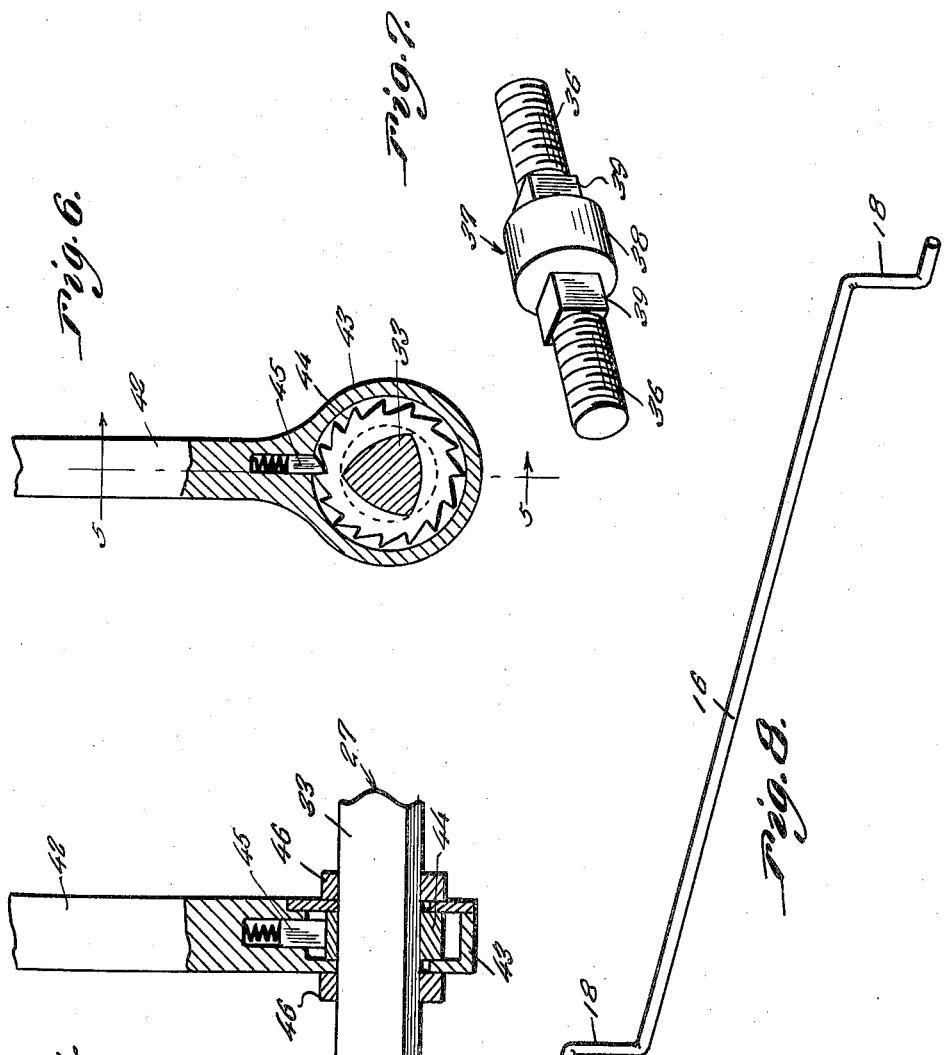

Patented Apr. 19, 1938

2,114,563

UNITED STATES PATENT OFFICE 2,114,563

WEEDING MACHINE

George Q. Heppner, Oldenburg, Ind.

Application March 17, 1937, Serial No. 131,488

5 Claims. (Cl. 97—42)

This invention relates to farming machinery and equipment, and has reference in particular to what may be called a rotary rod-type weeder of a post-seeding type.

In order to better appreciate the foregoing introductory general statement of the invention, it is to be pointed out here that the purpose of a post-seeding weeder is to remove wild oats, Russian thistle, Canadian thistle, and any other weeds such as are found in the semi-arid districts where summer fallow is practiced. In these districts it is practicable to sow wheat in the spring and about five to seven days later to follow through with a weeder to destroy the weeds. The weeds always have the advantage over the wheat in getting a start, because the weed seeds become scarified during the winter. Rod weeders now on the market destroy anywhere from four to six rows of wheat, due to the fact that the snouts dig into the ground and because of the uncontrollable draft of the side drive. Also, the depth to which the weeder runs is hard to control. When the rotary rod hits a rock, it is broken and must be either replaced or patched by welding.

By way of contrast, and as will be hereinafter appreciated, the subject matter of this invention has to do with a novel conception involving a rotary turf excavating rod having appropriate cross-sectional form and devoid of snouts which are objectionable for the foregoing reasons stated. Secondly, due to the assemblage and arrangement of properly selected and coordinated features, the attendant is not confronted with objectional side draft and hence the machine traverses the field with greater efficiency and determination.

Stated otherwise, an outstanding feature of the invention is predicated on the adoption and use of a portable wheel-supported frame structure having hanger brackets provided with bearings located in close proximity to the ground to accommodate a rotary driven excavating and weed cutting and eradicating rod aptly fitted for the purposes intended.

Of outstanding importance, however, is the specific construction of the so-called rotary rod unit, this being composed of a plurality of complemental sections joined together by unique replaceable couplings fashioned to provide journals for rotation in the low-down, underhung bearings on the frame structure, the advantage of this arrangement lending itself admirably well to expeditious repair of the sections of the rod if and when subjected to breakage at the joints.

The outstanding objective of the invention is to provide a machine adequately devised and mechanically perfected to justify its unqualified endorsement by the trade in that it fulfills the requirement of a long felt need in this particular line of endeavor and in so doing accomplishes my purposes in providing a novel contribution to the trade and art of a comparatively simple nature, an arrangement not known to have been utilized heretofore.

Other features and advantages will become more readily apparent from the following description and drawings.

In the drawings, wherein like numerals are employed to designate like parts throughout the same:

Figure 1 is a top plan view of the general assembly or machine as a whole showing the preferred embodiment thereof and the general arrangement and association of parts.

Figure 2 is a side view of the machine depicted in Figure 1 calculated to portray the ingenious simplified arrangement which I utilize.

Figure 3 is a section which may be said to be taken on the line 3—3 of Figure 1.

Figure 4 is an enlarged sectional and elevational view focusing attention on the unique bearing assembly.

Figure 5 is a section which may be said to be taken on the plane of the line 5—5 of Figure 6.

Figure 6 is a sectional view of a detail nature which may be described as taken approximately on the plane of the line 6—6 of Figure 3.

Figure 7 is a perspective view of the renewable or replaceable journal-type rod coupling unit.

Figure 8 is a perspective view of the rotary crank shaft.

Figure 9 is an end view of a facing washer seen in Figure 4.

Figure 10 is a perspective view of one of the sections of the sectional turf excavating or turning rod constituting the weed cutter.

Referring now to the drawings by distinguishing reference numerals, it will be observed in Figures 1 and 2 that the portable wheel-supported frame is indicated as a unit by the numeral 11. The parallel frame bars or hounds are connected at their rear ends to the axle 12 supported by the ground-engaging and propulsion wheels 13. In practice these may be suitably constructed to afford safe traction. Keyed for rotation on the central portion of the axle 12 is a V-pulley 14 aligned with a companion pulley 15 on a transverse or parallel crank shaft 16. The crank shaft 16 is journaled in suitable bearings 17, the cranks on the opposite ends thereof being denoted by the numerals 18. The numeral 19 designates a drive belt trained over the two pulleys whereby to cause the turning axle 12 to actuate the belt 19 and the crankshaft 16. The cranks 18 serve to operate pitman rods 20 which function in the manner to be hereafter described. The frame can be drawn by a tractor, but in most instances will be provided at its front with a truck 21 having a draft tongue 22 for horse-drawn power. Obviously, however, the source of power for moving the machine over the field is an immaterial factor.

Attention comes now to the numeral 23 which designates an appropriate rectangular underslung frame suitably supported from the frame 11 and disposed transverse to the line of draft. Incidentally, the numerals 24 designate suitable stabilizing braces cooperable with the two frame members. Then, too, the numerals 25 designate braces for the frame 23 while the numerals 26, seen in Figure 2, designate additional braces for the rotary turf turning or excavating and weeder rod 27. This rod 27 is located in close proximity to the earth, as illustrated in Figure 2, and is carried by a plurality of depending longitudinally spaced hanger brackets 28. These brackets are attached to and depend from the frame 23 and are preferably made to include bifurcated lower ends. The furcations 29, as shown in Figure 4, serve to accommodate the detachable tang 30 on the bearing plate 31, this being held between the furcations by a bolt and nut assembly 32.

It is to be observed that the weeder rod 27 is composed of a plurality of duplicate separable companion sections. These sections are denoted by the numerals 33 and are substantially triangular in cross-sectional form. It will be noted, however, that there is a slight curvature to the contacting or working surfaces of these sections 33 to facilitate rolling. Even so, the corner portions thereof function as suitable weed cutting edges as at 34. The adjacent ends of the sections 33 are provided with screw-threaded sockets 35. These sockets are adapted to accommodate the breakable threaded studs 36 on opposite ends of the coupling unit 27 seen in Figure 7. This coupling unit includes an enlarged central cylindrical portion 38 which constitutes a journal rotatable in the bearing plate 31. Attention is called to the polygonal elements 39 which constitute tool nuts and intervene between the studs 36 and journal 38. As indicated in Figure 4, these features 39 join the journal by way of a fragile or frangible connection 40. The numerals 41 designate spacing and thrust receiving washers carried by the tool nuts or grips 39.

The purpose of the arrangement shown in Figure 4 is such that if any one of the sections 33 comes into contact with a substantially immovably object such as a rock or stone, the strain will be brought to bear on the frangible joint 40. Hence, a break will occur at this comparatively weak spot. It follows, therefore, that by disassembling the bearing assembly, one of the washers 41 can be slipped off and the tool engaged with the grip 39 to remove the stud 36. Then, too, the other washer at the other end of the device can be gripped with a wrench to turn out the remaining stud and by thus removing the unit 37, it can be replaced while on the job without requiring any welding.

In practice it is understood that as the machine is drawn over the field, the pulley and belt means serves to actuate the pitmen 26. These pitmen are connected with rocker arms 42, each arm having a head 43 of an annular type embracing the rotary rod means 27. On the rod is a ratchet wheel 44 with which a spring pressed dog or pawl 45 is cooperable. This provides the desired ratcheting drive for the rod means 27. As a general proposition, it is advisable to stabilize the position of the rocker arms or connecting rods 42 by way of safety washers 46, as shown to advantage in Figure 5. Thus, these arms 42 rock back and forth utilizing the pawl and ratchet mechanism to turn the weeder unit 27. It follows that as this unit is imbedded lightly in the turf or earth, it turns it over sufficiently to undermine the weeds and to sever the weeds, without delving into the ground sufficiently deep to interfere with the sprouting crop of wheat.

It follows that as before indicated, one feature of the invention resides in the substantially triangular rotary rod means 27 properly suspended on a frame structure and digging into the ground, so to speak, to eradicate weeds, this being driven by propulsion means receiving power from the ground-engaging wheels. Just as important, however, is the sectional bearing assembly means depicted in Figure 4 designed to facilitate repair.

It is thought that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

I claim:

1. In a structure of the class described, a frame, wheel-supporting means for said frame, hangers depending from said frame and provided with bearings, and a weeder rod mounted for rotation in the bearings and in movable contact with the earth, and pawl and ratchet means cooperable with said rod and wheels to utilize the wheels to transmit motion to said pawl and ratchet means.

2. In a structural assemblage of the class described, a frame, an axle on said frame, wheels on said axle, a crank shaft mounted for rotation on said frame, a pulley on the crank shaft, a second pulley on the axle, a belt trained over said pulleys, a weeder rod supported from said frame and including ratchet wheels, actuating arms including portions embracing the ratchet wheels and spring pressed pawls engageable with the ratchet teeth, and pitman rod connections between said actuating arms and cranks on the crank shaft.

3. As a component part of an assemblage of the class described, a rotary weeder rod composed of a plurality of sections, couplings separably joining the sections together, said couplings including fragile portions in the manner and for the purposes described, and further including journal portions and tool gripping nuts.

4. As a new article of manufacture a coupling for use in association with a sectional weeder rod of the class described comprising a centrally disposed journal, a pair of aligned screw-threaded studs, said studs being formed with integral polygonal heads constituting tool grips, said tool grips being connected to opposite sides of the journal by fragile joints.

5. In a weeding machine of the class described, a mobile support, a plurality of hangers carried by said support and provided with bearings, a weeder rod mounted for rotation in the bearings and adapted for horizontal disposition and movable contact with the earth, said rod being substantially triangular in cross-sectional form and composed of a plurality of sections, couplings separably joining the sections together, said couplings including fragile portions, a ratchet wheel mounted on said rod for rotating it, and a mechanically operable pawl associated with said ratchet for actuating the same.

GEORGE Q. HEPPNER.